United States Patent
Notani et al.

(10) Patent No.: US 10,019,683 B1
(45) Date of Patent: Jul. 10, 2018

(54) FACILITATING THE NEGOTIATION OF STANDARDS FOR INTER-ENTERPRISE COLLABORATION BETWEEN TRADING PARTNERS

(75) Inventors: Ranjit N. Notani, Southlake, TX (US); Ramsyam Missula, Irving, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 2771 days.

(21) Appl. No.: 09/971,718

(22) Filed: Oct. 4, 2001

(51) Int. Cl.
| | | |
|---|---|---|
| *G06Q 20/00* | (2012.01) | |
| *G06Q 10/00* | (2012.01) | |
| *G06Q 30/00* | (2012.01) | |
| *G06Q 40/00* | (2012.01) | |
| *G06Q 10/06* | (2012.01) | |
| *G06Q 30/06* | (2012.01) | |
| *G06Q 50/18* | (2012.01) | |

(Continued)

(52) U.S. Cl.
CPC ....... *G06Q 10/06313* (2013.01); *G06Q 10/06* (2013.01); *G06Q 30/0208* (2013.01); *G06Q 30/06* (2013.01); *G06Q 40/04* (2013.01); *G06Q 50/188* (2013.01)

(58) Field of Classification Search
CPC ...... G06Q 10/087; G06Q 10/06; G06Q 40/04; G06Q 30/06; G06Q 10/10; G06Q 10/08; G06Q 30/0601; G06Q 10/101; G06Q 40/00; G06Q 10/06311; G06Q 10/06316; G06Q 50/184; G06Q 10/0637; G06Q 10/06375; G06Q 10/067; G06Q 20/4016; G06Q 40/06; G06Q 50/16; G06Q 50/188; G06Q 50/22; G06Q 50/28; G06Q 90/00; G06Q 10/06313

USPC ......... 705/1, 37, 36, 78, 80, 35, 7.23, 14.11; 707/10, 102; 709/230, 219

See application file for complete search history.

(56) References Cited

U.S. PATENT DOCUMENTS 5,101,353 A * 3/1992 Lupien et al. ............... 705/37
5,761,661 A * 6/1998 Coussens et al. ............. 707/9

(Continued)

OTHER PUBLICATIONS

XML in Financial Industries. Viewed at http://www.oasis-open.org/presentations/financial.pdf. Jun. 2001 p. 1-47.*

(Continued)

*Primary Examiner* — Jamie H Austin
(74) *Attorney, Agent, or Firm* — Spencer Fane LLP; Steven J. Laureanti

(57) ABSTRACT

A system that facilitates the negotiation of a standard for inter-enterprise collaboration between trading partners includes a set of meta-model elements. Each element in the set can be negotiated by enterprises and incorporated into a negotiated meta-model that describes an agreement between the enterprises as to collaborations between the enterprises. Each element in the set describes a portion of a potential standard for collaboration between enterprises. The system also includes a meta-model negotiation service that receives an indication that enterprises wish to negotiate a standard for collaborations between the enterprises and provides access to the set of elements and receive selections of one or more of the elements for negotiation and incorporation into a negotiated meta-model. The negotiated meta-model describes an agreement between the enterprises as to collaborations between the enterprises.

33 Claims, 4 Drawing Sheets

(51) Int. Cl.
*G06Q 30/02* (2012.01)
*G06Q 40/04* (2012.01)

(56) References Cited

U.S. PATENT DOCUMENTS

| | | | | |
|---|---|---|---|---|
| 5,794,207 | A * | 8/1998 | Walker et al. | 705/1 |
| 5,809,483 | A * | 9/1998 | Broka et al. | 705/37 |
| 5,915,209 | A * | 6/1999 | Lawrence | 340/3.7 |
| 5,950,176 | A * | 9/1999 | Keiser et al. | 705/36 R |
| 6,014,627 | A * | 1/2000 | Togher et al. | 705/1 |
| 6,236,972 | B1 * | 5/2001 | Shkedy | 705/1 |
| 6,338,050 | B1 * | 1/2002 | Conklin et al. | 705/80 |
| 6,347,307 | B1 * | 2/2002 | Sandhu et al. | 705/36 R |
| 6,408,303 | B1 * | 6/2002 | Richards | 707/102 |
| 6,418,419 | B1 * | 7/2002 | Nieboer et al. | 705/37 |
| 6,647,420 | B2 * | 11/2003 | Hellbusch et al. | 709/226 |
| 6,718,331 | B2 * | 4/2004 | Davis et al. | 707/10 |
| 6,721,713 | B1 * | 4/2004 | Guheen et al. | 705/1 |
| 6,892,195 | B2 * | 5/2005 | Lee et al. | 706/61 |
| 6,957,199 | B1 * | 10/2005 | Fisher | 705/78 |
| 7,039,597 | B1 * | 5/2006 | Notani et al. | 705/9 |
| 7,054,880 | B2 * | 5/2006 | Vishik et al. | 707/102 |
| 7,069,234 | B1 * | 6/2006 | Cornelius et al. | 705/26 |
| 7,373,323 | B1 * | 5/2008 | Dalal | G06Q 10/087 705/35 |
| 2001/0047276 | A1 * | 11/2001 | Eisenhart | G06Q 10/10 705/37 |
| 2002/0019761 | A1 * | 2/2002 | Lidow | G06Q 10/02 705/5 |
| 2002/0040352 | A1 * | 4/2002 | McCormick | 705/80 |
| 2002/0042782 | A1 * | 4/2002 | Albazz | G06Q 10/10 705/80 |
| 2002/0046125 | A1 * | 4/2002 | Speicher et al. | 705/22 |
| 2002/0046294 | A1 * | 4/2002 | Brodsky et al. | 709/246 |
| 2002/0091539 | A1 * | 7/2002 | Yin et al. | 705/1 |
| 2002/0091614 | A1 * | 7/2002 | Yehia et al. | 705/37 |
| 2002/0128946 | A1 * | 9/2002 | Chehade et al. | 705/37 |
| 2002/0165975 | A1 * | 11/2002 | Abbott | 709/230 |
| 2002/0178127 | A1 * | 11/2002 | Byde et al. | 705/80 |
| 2003/0115129 | A1 * | 6/2003 | Feaver et al. | 705/37 |

OTHER PUBLICATIONS

Webber, David. Understanding ebXML, UDDI and XML/EDI. XML/BDI Group. (2000). p. 119-123.*

Peregrine Systems, Inc. Enterprise e-Business Product Descriptions, Retrieved from the Internet Feb. 12, 2002: <URL:http://sdweb02.peregrine.com/prgn_corp_ap/Products/pstProductsOverviewBP.cfm?ProductFamilyid=D54F33CD-AAB4-11D4-9C240090277322BD>.

* cited by examiner

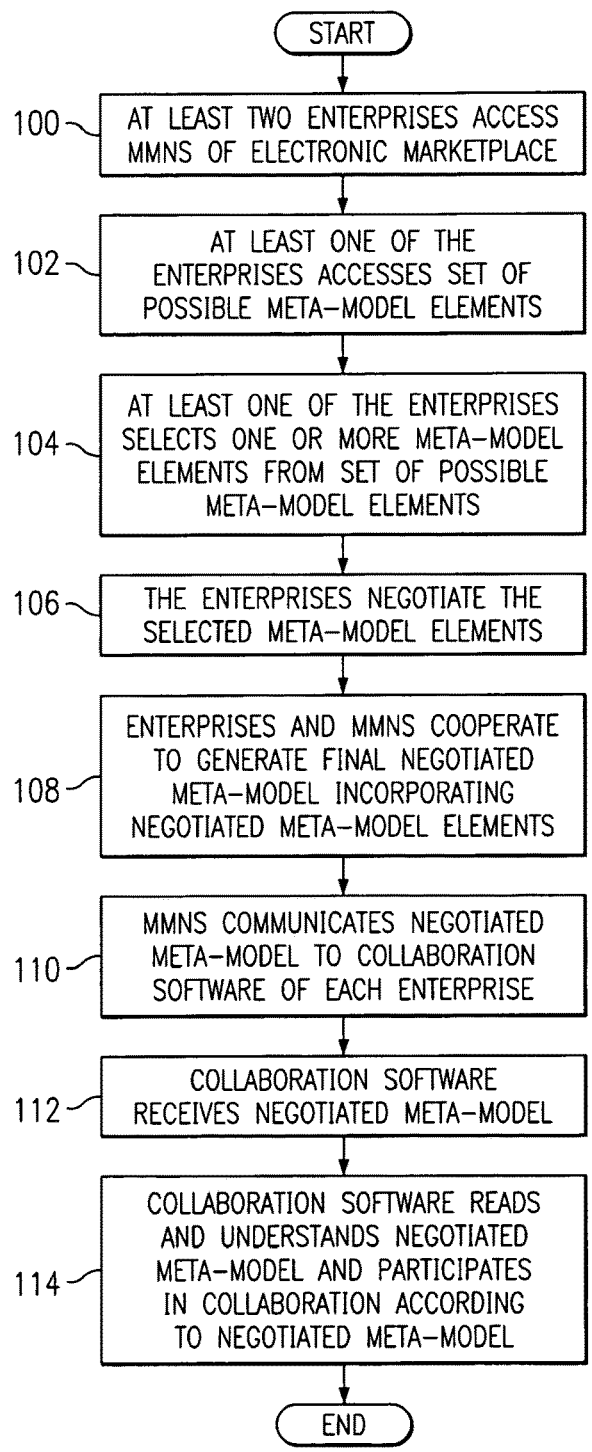

FACILITATING THE NEGOTIATION OF STANDARDS FOR INTER-ENTERPRISE COLLABORATION BETWEEN TRADING PARTNERS

TECHNICAL FIELD OF THE INVENTION

This invention relates generally to electronic commerce, and more particularly to facilitating the negotiation of standards for inter-enterprise collaboration between trading partners.

BACKGROUND OF THE INVENTION

For trading partners to collaborate, they must first agree on a set of standards for collaboration. One option for agreeing on a set of standards for collaboration is to utilize public standards. These are "one-size-fits-all," lowest common denominator standards that are unlikely to allow trading partners to differentiate themselves or adapt to the nuances of their businesses. Another option for agreeing on a set of standards for collaboration is to negotiate a private, differentiated standard. Once such a standard is negotiated (typically in extensible markup language (XML) form), significant time (e.g., months) may be required to enable the back-end collaboration software of the trading partners to adapt to the private standard. This can dramatically slow down efforts to establish and maintain collaborative relationships between the trading partners.

SUMMARY OF THE INVENTION

The present invention may reduce or eliminate at least some disadvantages and problems associated with previous techniques for establishing standards for inter-enterprise collaboration.

In accordance with a particular embodiment of the present invention, a system for facilitating negotiation of a standard for inter-enterprise collaboration between trading partners includes a set of one or more meta-model elements. Each meta-model element in the set is capable of being negotiated by two or more enterprises and incorporated into a negotiated meta-model that describes an agreement between the enterprises as to collaborations between the enterprises, each meta-model element in the set describing a portion of a potential standard for collaboration between enterprises. The system also includes a meta-model negotiation service operable to receive an indication that two or more enterprises wish to negotiate a standard for collaborations between the enterprises The meta-model negotiation service provides access to the set of meta-model elements and receives selections of one or more of the meta-model elements for negotiation and incorporation into a negotiated meta-model that describes an agreement between the enterprises as to collaborations between the enterprises. The meta-model negotiation service facilitates negotiation of the selected meta-model elements, incorporates the negotiated meta-model elements into the negotiated meta-model for collaborations between the enterprises, and communicates the negotiated meta-model to the enterprises to enable collaborations between the enterprises according to the standard for collaborations reflected in the negotiated meta-model.

In accordance with another embodiment, collaboration software associated with an enterprise is embodied in computer-readable media and when executed is operable to receive a negotiated meta-model from a meta-model negotiation service. The negotiated meta-model incorporates multiple negotiated meta-model elements selected from a stored set of meta-model elements. Each meta-model element in the set is capable of being negotiated by two or more enterprises and describes a portion of a potential standard for collaboration between enterprises. The negotiated meta-model describes an agreement as to collaborations between the associated enterprise and one or more other enterprises and is negotiated by the associated enterprise and the one or more other enterprises using the meta-model negotiation service. The collaboration software is operable to understand semantics of the negotiated meta-model substantially independent of modification of the collaboration software subsequent to negotiation of the meta-model and to substantially automatically collaborate with the one or more other enterprises according to the standard for collaborations reflected in the negotiated meta-model received at the collaboration software.

In accordance with another embodiment, a negotiated meta-model enabling collaboration between two or more enterprises incorporates a number of negotiated meta-model elements selected from a stored set of meta-model elements each capable of being negotiated by two or more enterprises. Each meta-model element in the set describes a portion of a potential standard for collaboration between enterprises. The negotiated meta-model describes an agreement as to collaborations between two or more enterprises and is negotiated by the two or more enterprises using a meta-model negotiation service associated with a network service provider. The negotiated meta-model includes semantics capable of being understood by collaboration software associated with each of the two or more enterprises substantially independent of any modification of the collaboration software subsequent to negotiation of the meta-model, such that the collaboration software of the two or more enterprises is operable to substantially automatically collaborate according to the standard for collaborations reflected in the negotiated meta-model.

Certain embodiments of the present invention provide one or more technical advantages. For example, certain embodiments may provide a system for facilitating negotiation of a standard for inter-enterprise collaboration between trading partners using a trading partner agreement (TPA) that is substantially "machine-actionable," in that it may be understood and automatically acted upon by "adaptive" collaboration software of the trading partners substantially immediately upon its creation, without extensive modification of the collaboration software. This may dramatically reduce the time, expense, and needed resources associated with prior techniques in which developers, analysts, and other personnel associated with each trading partner were required to independently understand a collaboration standard and then encode its semantics in their collaboration software before collaboration based on the standard could occur. Accordingly, significant time, expense, and resources associated with establishing inter-enterprise collaborations may be saved in certain embodiments.

Certain embodiments of the invention may provide a meta-model negotiation service (MMNS) that allows trading partners to select certain meta-model elements from a template of possible meta-model elements, negotiate the selected meta-model elements according to particular needs, and have the negotiated meta-model elements incorporated into a complete negotiated meta-model for use in future collaborations between these trading partners. The MMNS may be a service provided by a network service provider. Use of the MMNS may allow trading partners to negotiate a private, differentiated meta-model, corresponding to a negotiated TPA, that provides value to the trading partners above and beyond what any existing "one size fits all," lowest common denominator standards may provide. Trading partners that have access to the MMNS and can therefore participate in negotiating a customized TPA with their trading partners may gain additional business as a result, particularly if those trading partners have adaptive collaboration software sufficient to read, understand, and act upon machine-actionable TPAs received from MMNS.

One or more other technical advantages may be readily apparent to one skilled in the art from the figures, descriptions and claims included herein. Moreover, while specific advantages have been enumerated above, various embodiments may include all, some or none of the enumerated advantages.

BRIEF DESCRIPTION OF THE DRAWINGS

For a more complete understanding of the particular embodiments of the invention and their advantages, reference is now made to the following descriptions, taken in conjunction with the accompanying drawings, in which:

FIG. 7 illustrates an example method for facilitating the negotiation of a standard for inter-enterprise collaboration between trading partners.

DESCRIPTION OF EXAMPLE EMBODIMENTS

Figure 1:
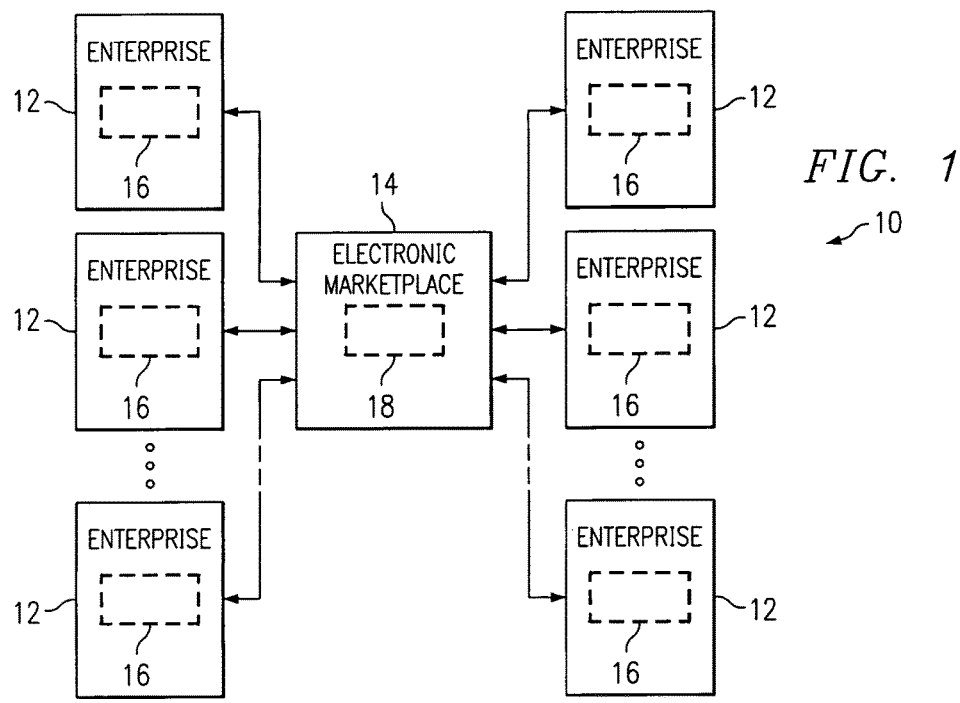
FIG. 1 illustrates an example system for facilitating the negotiation of a standard for inter-enterprise collaboration between trading partners.

FIG. 1 illustrates an example system 10 for facilitating the negotiation of a standard for inter-enterprise collaboration between trading partners. In general, according to the present invention, two or more enterprises 12 use an electronic marketplace or other network service provider 14 to negotiate a standard, which may be a private standard unique to these enterprises 12, for collaboration between the enterprises 12. The negotiated standard may be referred to where appropriate as a TPA and is preferably at least substantially "machine-actionable," such that collaboration software 16 of enterprises 12 can automatically execute a business process according to the negotiated standard substantially immediately upon creation of the standard, without requiring extensive modification of the collaboration software 16.

A meta-model is a description of a TPA that software, such as collaboration software 16, can read and understand. A meta-model may contain XML data or any other suitable type of software-readable data, depending on the implementation. In one embodiment, network service provider 14 supports an MMNS 18 to facilitate the negotiation of standards, in the form of TPAs, for collaboration between enterprises 12. In certain embodiments, the MMNS 18 may be referred to as a joint business planning network service (JBPNS). Although MMNS 18 is described, any suitable service may be supported at network service provider 14 to provide the features and operation described herein. Although MMNS 18 is described as being supported at network service provider 14, MMNS 18 may be supported using any appropriate computer system intermediate to enterprises 12. Furthermore, in certain embodiments MMNS 18 may operate wholly or partially at enterprises 12. As an example, each enterprise 12 may support suitable portions of MMNS 18, such that communication between portions of MMNS 18 at different enterprises 12 may occur to negotiate standards for collaboration between enterprises 12.

In contrast to previous techniques, as described above, TPAs according to the present invention are preferably machine-actionable, such that collaboration software 16 of enterprises 12 can understand a negotiated TPA and, substantially immediately upon its creation, begin collaborating according to the negotiated TPA with collaboration software 16 of one or more other enterprises 12 that participated in negotiating the TPA. In one embodiment, this may be achieved by describing the entire meta-model of the standard reflected in the TPA in a form such that collaboration software 16 can understand its semantics and adapt to the standard accordingly. Previous techniques have required developers, analysts, and other personnel associated with enterprises 12 to understand a collaboration standard and then encode its semantics in collaboration software 16 of associated enterprises 12. This process may take significant time (e.g., months) and has been a major factor in the lack of adoption of private, differentiated collaboration standards.

Enterprises 12 associated with network service provider 14 may be current or prospective trading partners and may include manufacturers, distributors, wholesalers, retailers, suppliers, end customers, or any other entities that participate in business processes or transactions. Enterprises 12 and network service provider 14 may each operate on one or more computer systems at one or more locations and may share data storage, communications, or other resources according to particular needs. These computer systems may include suitable input devices, output devices, mass storage media, processors, memory, or other components for receiving, processing, storing, and communicating information according to the operation of system 10.

Network service provider 14 may be a business-to-business (B2B), business-to-consumer (B2C), or other network service provider that links enterprises to each other. Enterprises 12 may interact with network service provider 14 autonomously or according to suitable input from any number of associated users. Enterprises 12 may be coupled to network service provider 14 using one or more local area networks (LANs), metropolitan area networks (MANs), wide area networks (WANs), a global computer network such as the Internet, or any other wireline, optical, wireless, or other links. Enterprises 12 and network service provider 14 may communicate with each other according to a hub-and-spoke, peer-to-peer, or other suitable architecture. In one embodiment, system 10 is implemented using a hub-and-spoke architecture in which the spokes are appropriately integrated with enterprise systems of enterprises 12 and allow schedule-based data transfer between these enterprise systems and network service provider 14.

Figure 2:
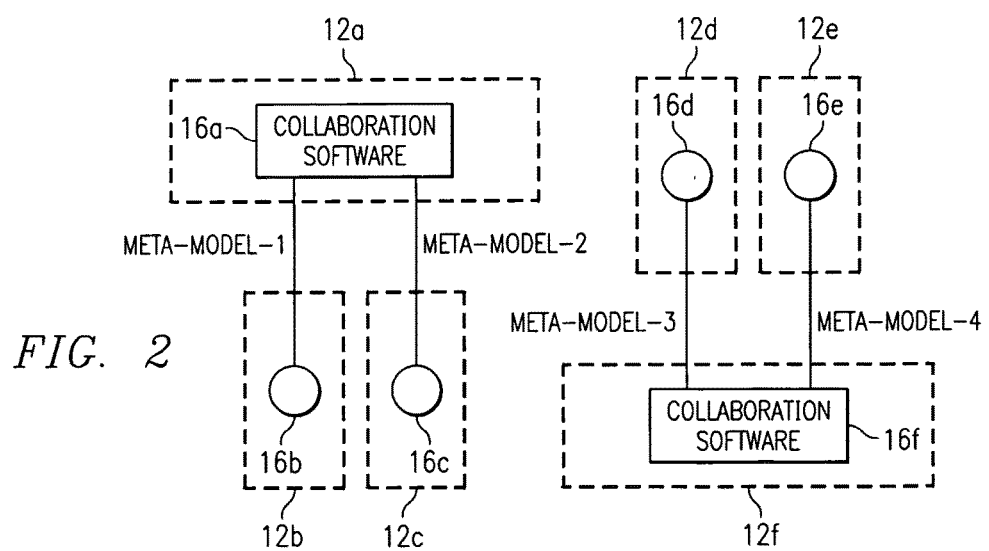
FIGS. 2 through 5 illustrate example negotiation of a standard for inter-enterprise collaboration between trading partners.

FIGS. 2 through 5 illustrate example negotiation of a standard for inter-enterprise collaboration between trading partners. In an initial state, as illustrated in FIG. 2, collaboration software 16a associated with enterprise 12a collaborates with collaboration software 16b associated with enterprise 12b using a first meta-model ("Meta-Model-1"). Meta-Model-1 describes a TPA suitable for collaboration between collaboration software 16a and 16b and may be a standard TPA, a private TPA developed other than using MMNS 18, or a TPA negotiated according to the present invention using MMNS 18. In the illustrated embodiment, the collaboration software 16a also collaborates with collaboration software 16c using a second meta-model ("Meta-Model-2"), which like Meta-Model-1 may be any suitable meta-model. Similarly, collaboration software 16f collaborates with collaboration software 16d and 16e using appropriate third ("Meta-Model-3") and fourth ("Meta-Model-4") meta-models, respectively. Although particular collaborations and associated meta-models are illustrated and described for purposes of explanation, any suitable collaborations and meta-models may exist.

Figure 3:
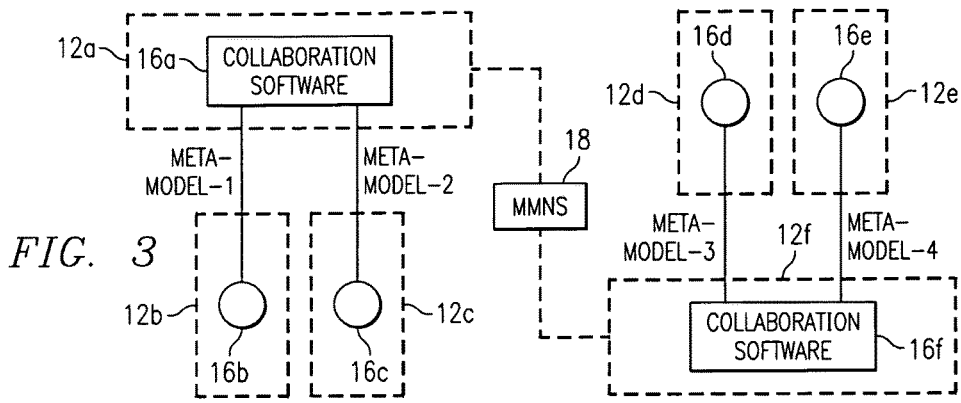

In the example negotiation scenario being illustrated, enterprises 12a and 12f supporting collaboration software 16a and 16f, respectively, wish to collaborate with one another. Accordingly, as illustrated in FIG. 3, enterprises 12a and 12f begin negotiating a standard to serve as the basis for collaboration between them. Through MMNS 18, enterprises 12 and 12f negotiate one or more meta-model elements that will be used to formulate a meta-model describing a negotiated TPA customized for their needs and suitable for their future collaboration. The negotiated meta-model elements and resulting meta-model may be distinctive to collaboration software 16a and 16f. In one embodiment, enterprises 12a and 12f may select one or more meta-model elements from a set of possible meta-model elements communicated to or otherwise made available to the enterprises 12a and 12f by MMNS 18. The set of possible meta-model elements may be provided in the form of a template accessible to enterprises 12. The set of possible meta-model elements is preferably constructed to include all meta-model elements that would be of interest to enterprises 12 within the marketplace environment of network service provider 14. However, at least in certain embodiments, MMNS 18 may also support the ability of enterprises 12 to define new meta-model elements for use in combination with or instead of pre-validated meta-model elements in the predefined set of possible meta-model elements supported by MMNS 18.

Each meta-model element typically deals with an associated set of potential terms, definitions, or standards that may collectively provide a complete description of a negotiated TPA. For example, meta-model elements supported by MMNS 18 may include supply chain elements (also possibly referred to as dimensions) such as item (i.e. part number, stockkeeping unit (SKU), or other identifier), buffer (i.e. item at a location), site (i.e. location from which or to which shipping will take place), and resource (representing capacity). Once one or more of these or other supply chain elements have been negotiated and incorporated into a TPA, enterprises 12a and 12f can subsequently collaborate upon these elements to determine, for example, exactly which items will be involved in a business transaction, where the items are located, where they will be shipped from or shipped to, and what capacity will be needed to process the items.

MMNS 18 may support one or more other types of meta-model elements that may be negotiated by enterprises 12 to serve as the basis for a negotiated TPA. For example, supported meta-model elements may include, in any suitable combination and without limitation: (1) role type elements that define who can participate in the collaboration (e.g., suppliers or buyers); (2) combinations of supply chain elements (also possibly referred to as dimensionality) on which collaboration may take place (e.g., item-site (ship from)-site (ship to), site (ship from)-buffer, etc.); (3) access particular role types have to particular dimensionality; (4) collaborative transaction type (e.g., request for quote (RFQ)) relative to dimensionality, such as the structure (e.g., hierarchical) and data elements of the transaction, a full state or other model describing the lifecycle of the transaction, the access that a role type has to the data elements of the transaction relative to the state of the transaction, the actions that a role type can execute on the transaction relative to the state of the transaction, and whether the transaction is the system of record or instead whether there is another system of record with which synchronization must occur; (5) shared computations, problems, alerts, and the like which both enterprises 12 can view (e.g., defined as shared JAVA classes operating on the collaborative transaction which can execute on a standard JAVA Virtual Machine (JVM) at either enterprise 12; and (6) temporal horizon structure of the collaborative transaction (e.g., number of days, followed by number of weeks, followed by number of months). Although particular meta-model elements are described as examples, any appropriate meta-model elements may be supported at MMNS 18, selected by one or both enterprises 12 for negotiation, and negotiated by enterprises 12, according to particular needs.

Figure 4:
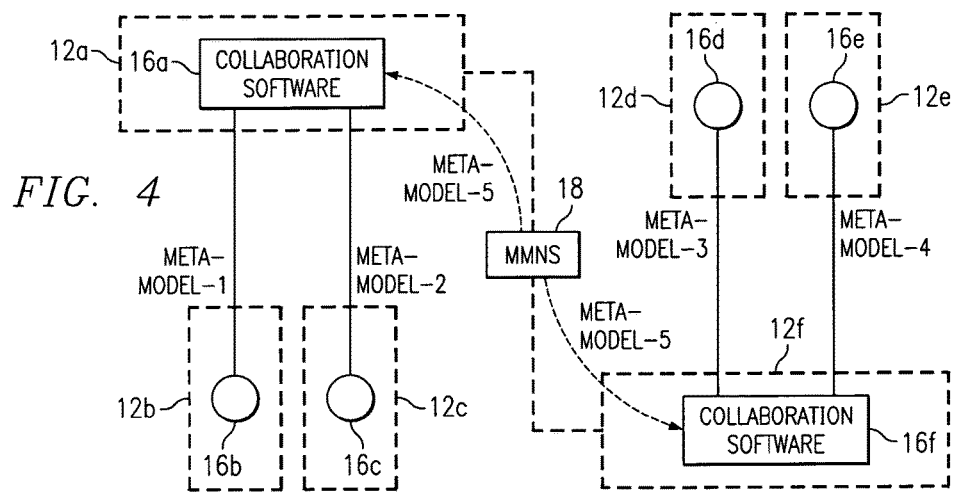
Figure 5:
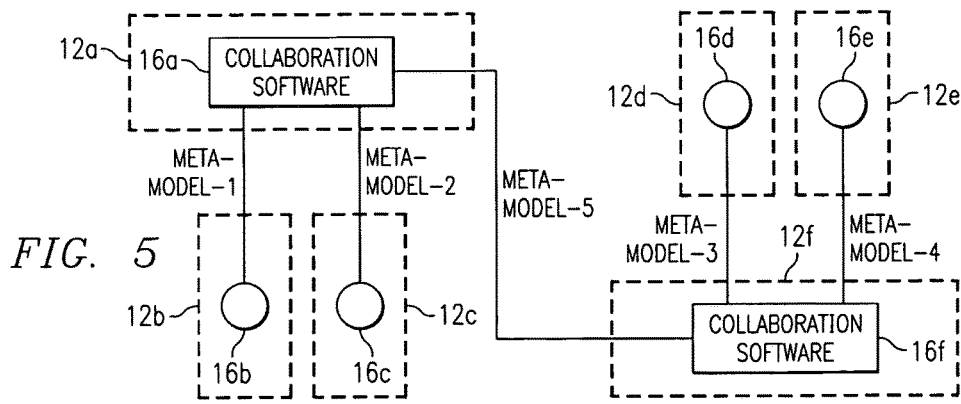

Once the appropriate meta-model elements have been negotiated, MMNS 18 formulates a meta-model for the TPA including the negotiated meta-model elements. As illustrated in FIG. 4, MMNS 18 communicates the negotiated meta-model ("Meta-Model-5") to collaboration software 16a and 16f of enterprises 12a and 12f, respectively, in any suitable manner. Collaboration software 16a and 16f are capable of receiving and accepting the negotiated meta-model, as reflected in an associated TPA, understanding the semantics of the negotiated meta-model, and collaborating according to the negotiated meta-model. Collaboration may include executing one or more collaborative transactions according to the negotiated TPA. In the preferred embodiment, as described above, collaboration software 16a and 16f are capable of collaborating according to the negotiated TPA substantially immediately upon its creation, with little or no modification to collaboration software 16a and 16f. This may provide an important technical advantage.

In one embodiment, to enable collaboration software 16 to readily understand the semantics of any negotiated meta-model received from MMNS 18, collaboration software 16 is developed such that is understands the semantics of all possible meta-model elements supported by MMNS 18. As a result, the collaboration software 16 understands and is capable of collaborating, substantially automatically, according to any negotiated meta-model that includes any combination of supported meta-model elements. Where collaboration software 16 has this capability, it may be referred to as being adaptive. As noted above, a negotiated TPA capable of being understood and then acted on substantially immediately and without significant modification of collaboration software 16 may be said to be machine-actionable.

In one example, enterprise 12a may be a buyer and enterprise 12f may be a supplier. Enterprises 12a and 12f have negotiated a meta-model (Meta-Model-5) based on item and site elements which has been formulated and communicated to collaboration software 16a and 16f by MMNS 18. In one example, enterprises 12a and 12f have negotiated a meta-model (Meta-Model-5) that will govern their future collaboration. They have negotiated that the purpose of the collaboration is to fulfill demand at a buyer site from a particular supplier site for a particular item. Enterprises 12a and 12f have also negotiated the structure of the collaborative transactions in terms of items, buyer sites, and supplier sites. The association between the negotiated collaborative transaction and the underlying supply chain elements such as item and site are in this example critical for the further negotiation of exceptions and events which are dependent on the state of the entire supply chain and other collaborative transactions in the supply chain. Enterprises 12a and 12f have further negotiated the nature that the demand signal will take, the nature that the supply response will take, and the protocol the adaptive collaboration software 16a and 16f will use to convey these signals. Furthermore, enterprises 12a and 12f have negotiated exception conditions that will manifest themselves when a particular party does not adhere to the negotiated protocol. Moreover, enterprises 12a and 12f have negotiated the logistics to physically ship the items.

Collaboration software 16a and 16f may collaborate in accordance with the negotiated meta-model (Meta-Model-5) and determine that an item with a particular SKU is needed by enterprise 12a at a particular buyer site. This demand is then propagated to the supplier collaboration software 16f in accordance with the meta-model. The supplier's collaboration software 16f will then respond to this demand signal in accordance with the negotiated meta-model. If the response is within parameters, the buyer's collaboration software 16a will execute a purchase order in accordance with the meta-model. The supplier 12f will then ship the desired quantity of items on the desired date in accordance with the negotiated logistics model. At all times during the collaboration, the collaboration software 16a and 16f monitors this (and also other collaborative transactions) in relation to the supply chain to detect exception conditions and initiate events. Although a particular example is described, those skilled in the art will appreciate that the present invention is not limited to any particular collaboration scenario.

Figure 6:
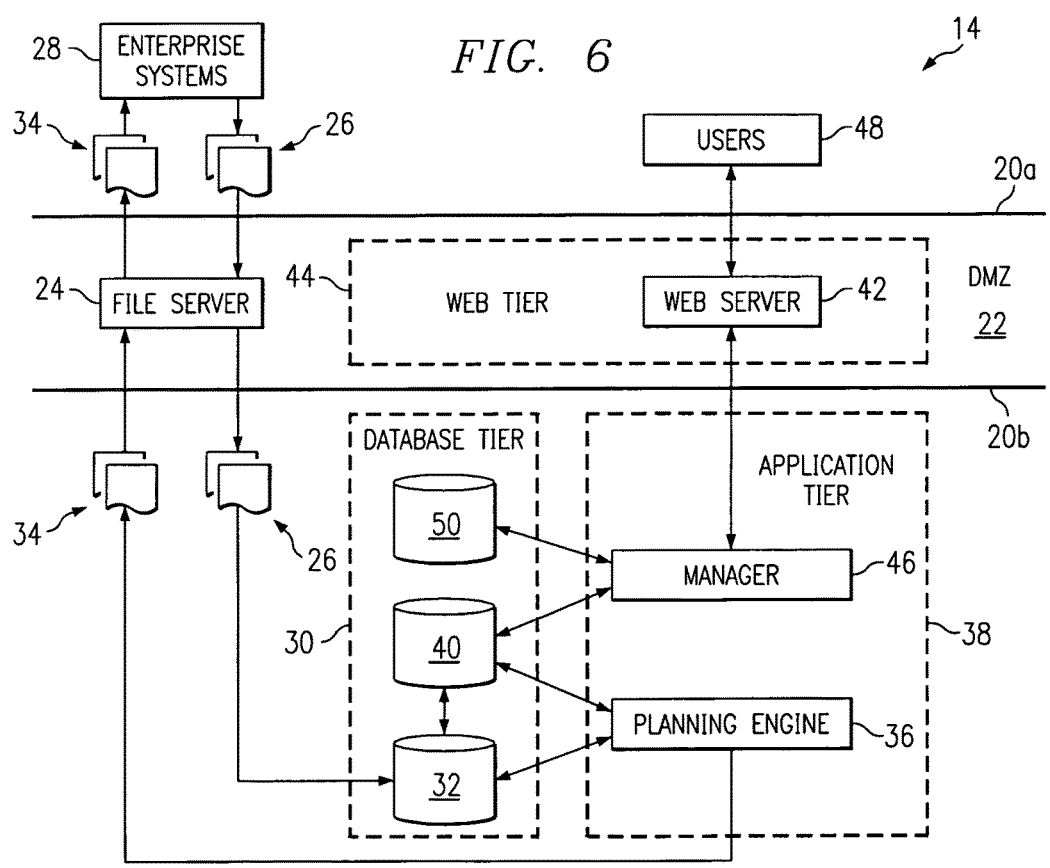
FIG. 6 illustrates an example network service provider.

FIG. 6 illustrates an example network service provider 14 and interactions with various enterprises 12 in further detail. Network service provider 14 may include one or more firewalls 20 establishing a "DMZ" or other secure area 22 that separates enterprises 12 from certain processing and data storage resources of the network service provider 14. In one embodiment, DMZ 22 isolates a file transfer protocol (FTP) or other file server 24 that receives data files 26 from enterprise systems 28 associated with enterprises 12. File server 24 communicates data files 26 to a database tier 30 of network service provider 14 for storage in database 32 as flatfiles or otherwise. Where network service provider 14 provides one or more hosted planning services, file server 24 may also receive planning output 34 from one or more planning engines 36 in an application tier 38 of network service provider 14. File server 24 may communicate planning output 34 to the enterprise systems 28 of enterprises 12 as appropriate. Planning engine 36 may interact with database 32 or, more preferably with respect to particular tasks, with an active data warehouse (ADW) 40 in which the information contained in data files 26 may be stored and updated.

DMZ 22 also isolates one or more web servers 42, within a web tier 44 of network service provider 14, that communicate between manager 46 in application tier 38 and one or more users 48 associated with the enterprises 12. For example, web server 42 may communicate with such users 48 using Hypertext Markup Language (HTML) pages or Extensible Markup Language (XML) documents contained within Secure Hypertext Transfer Protocol (S-HTTP) or other suitable requests. While file-based, web-based, and other communication techniques are described as examples, enterprises 12 may communicate with network service provider 14 in any appropriate manner without departing from the intended scope of the present invention. Where appropriate, reference to the actions of enterprises 12 is meant to encompass the actions of associated enterprise systems 28 and/or associated users 48. As described above, enterprises 12 may be entirely or at least substantially autonomous in certain embodiments.

Database 50 may store the meta-model elements that may be negotiated by enterprises 12 and information concerning the formulation of one or more negotiated meta-models based on individual negotiated meta-model elements. For example, as described above, database 50 may store a template containing all the possible meta-model elements which may be negotiated by enterprises 12 for inclusion in a final meta-model describing a particular negotiated TPA. Database 50 may also store one or more meta-models that have been used by enterprises 12 for previous transactions and can be modified, for example, on an element by element basis, to form new negotiated meta-models. Database 50 may store any suitable information relevant to the process of negotiating meta-model elements and formulating complete negotiated meta-models based on these elements.

In one embodiment, manager 46 is responsible for managing the flow of data to, from, and within the network service provider 14 in connection with the negotiation of meta-model elements for a TPA, using the negotiated meta-model elements to formulate a complete meta-model for the TPA, and other activities described more fully above. Manager 46 may have access to ADW 40 if appropriate and may access the information stored in database 50 in connection with its operations. Although database 32, ADW 40, and database 50 are described as being separate, the present invention contemplates these components being wholly or partially integral to one another, according to particular needs.

The components of network service provider 14 may be implemented using any suitable combination of software, firmware, hardware, or other suitable components. Software components of network service provider 14 may be implemented according to any suitable software methodologies. For example, planning engine 36 and manager 46 may be implemented using object-oriented software methodologies, and the meta-model elements, meta-models, and TPAs may be represented using JAVA classes or other suitable object-oriented constructs.

FIG. 7 illustrates example method of facilitating negotiation of a standard for inter-enterprise collaboration between trading partners. The method begins at step 100, where at least two enterprises 12 wishing to collaborate access MMNS 18 of network service provider 14. At least one of these enterprises 12 accesses the set of possible meta-model elements supported by MMNS 18, in the form of a template or otherwise, at step 102. The current default meta-models of the two partners are also preferably made available at the time of negotiation. The resulting negotiated meta-model may be identical to one or other of the partner's meta-model, may be a hybrid of the current default meta-models, or may be completely unrelated to the current default meta-models. At least one of the enterprises 12 selects one or more meta-model elements from the set at step 104 and negotiates with the one or more other enterprises 12 as to the selected meta-model elements according to their particular needs at step 106. Enterprises 12 may negotiate meta-model elements individually in any suitable sequence, substantially simultaneously, or in any other suitable manner. At step 108, enterprises 12 and MMNS 18 cooperate to generate a final negotiated meta-model that incorporates the individual negotiated meta-model elements. The negotiated meta-model describes a TPA for future collaborations between the trading partners. Although the negotiated meta-model may be referred to as being complete or final, the present invention contemplates the meta-model being re-negotiated in response to specified triggers, periodically, or in any other suitable manner. Additionally, the meta-models are preferably versioned to facilitate re-negotiation. At step 110, MMNS 18 communicates the negotiated meta-model to collaboration software 16 of each enterprise 12. The collaboration software 16 of each enterprise 12 receives the negotiated meta-model at step 112. Where the TPA for the negotiated meta-model is machine-actionable and collaboration software 16 of each enterprise is adaptive, at step 114 the collaboration software 16 preferably reads the negotiated meta-model, understands its semantics, and can participate in collaborative business processes or transactions with other enterprise 12 according to the negotiated meta-model and its associated TPA.

Although the present invention has been described in detail, various changes and modifications may be suggested to one skilled in the art. It is intended that the present invention encompass such changes and modifications as falling within the scope of the appended claims.

The invention claimed is:

1. A computer-implemented system, comprising:
a non-transitory computer-readable storage medium having a set of one or more predefined meta-model elements stored therein, each of the one or more predefined meta-model elements is incorporated into a negotiated meta-model that describes an agreement between two or more enterprises as to collaborations between the two or more enterprises, each of the one or more meta-model elements comprising data describing a standard for collaboration between the two or more enterprises;
a non-transitory computer-readable storage medium having a collaboration software stored therein and configured to execute one or more collaborative transactions based on the negotiated meta-model, the two or more enterprises having the collaboration software;
a non-transitory computer-readable storage medium having a meta-model negotiation service stored therein and configured to:
receive an indication from the collaboration software of the two or more enterprises that the two or more enterprises wish to negotiate a standard for collaborations between the two or more enterprises;
provide the collaboration software of the two or more enterprises access to the predefined set of one or more meta-model elements;
receive selections of one or more of the predefined meta-model elements and one or more meta-model elements that is newly defined by at least one of the enterprises for negotiation and incorporation into a negotiated meta-model, the negotiated meta-model describing an agreement between the enterprises as to collaborations between the two or more enterprises;
facilitate negotiation of the selected meta-model elements between the two or more enterprises, wherein the negotiated meta-model includes semantics capable of being understood by the collaboration software associated with each of the two or more enterprises independent of any modification of the collaboration software, the collaboration software of the two or more enterprises automatically collaborates according to the standard for collaborations based on the negotiated meta-model;
incorporate negotiated meta-model elements into the negotiated meta-model for collaborations between the two or more enterprises, the negotiated meta-model elements comprising a demand signal element, a supply response element, and one or more exception conditions;
communicate the negotiated meta-model to the collaboration software of the two or more enterprises for collaborations between the two or more enterprises based on the standard for collaborations in the negotiated meta-model;
automatically executing a supply response in accordance with the negotiated meta-model when a demand signal is communicated from the collaboration software of one of the two or more enterprises to the collaboration software of the other of the two or more enterprises and the demand signal is in accordance with the negotiated meta-model; and
automatically executing one or more exception conditions when a demand signal is communicated from the collaboration software of one of the two or more enterprises to the collaboration software of the other of the two or more enterprises and the demand signal is not in accordance with the negotiated meta-model.

2. The computer-implemented system of claim 1, wherein the meta-model negotiation service is configured to communicate the negotiated meta-model to the collaboration software of the enterprises, the collaboration software configured to understand and collaborate based on the negotiated meta-model substantially automatically and substantially independent of modification to the collaboration software subsequent to negotiation of the meta-model.

3. The computer-implemented system of claim 1, wherein the agreement associated with the negotiated meta-model is machine-actionable at the collaboration software of the enterprises and reflects a private, differentiated standard for collaboration customized for particular needs of the enterprises.

4. The computer-implemented system of claim 1, wherein each of the one or more meta-model elements within the set comprise one or more of the following:
role types;
dimensions each comprising a supply chain element;
dimensionalities each comprising a combination of supply chain elements;
access of particular role types to particular dimensionalities;
collaborative transaction types relative to particular dimensionalities;
shared operations visible to the at least two enterprises; and
temporal structures of collaborative transactions.

5. The computer-implemented system of claim 4, wherein each of the one or more meta-model elements specifying a collaborative transaction type relative to a particular dimensionality comprises one or more of the following:
structure of the transaction;
data elements associated with the transaction;
a state model describing a life cycle of the transaction;
access that a role type has to data elements of the transaction relative to a state of the transaction;
actions that a role type can execute on the transaction relative to a state of the transaction; and
whether the transaction is a system of record or whether synchronization must occur with another system of record.

6. The computer-implemented system of claim 1, wherein the set of the one or more meta-model elements is specified in a template.

7. The computer-implemented system of claim 1, wherein the meta-model negotiation service comprises a joint business planning network service (JBPNS).

8. The computer-implemented system of claim 1, wherein the meta-model negotiation service is associated with a network service provider through which the enterprises can negotiate the set of one or more meta-model elements.

9. The computer-implemented system of claim 1, wherein the negotiated meta-model is represented using extensible markup language (XML).

10. The computer-implemented system of claim 1, wherein a collaboration comprises execution of a business process or transaction based on the negotiated meta-model.

11. The system of claim 1, further comprising a non-transitory computer-readable storage medium comprising a collaboration service which monitors the one or more exception conditions, and automatically executes an event based on a detection of an exception condition.

12. A computer-implemented method, the method performed using one or more computers, the method comprising:
receiving, by a computer, an indication from a collaboration software of two or more enterprises that the two or more enterprises wish to negotiate a standard for collaborations between the two or more enterprises, the collaboration software configured to execute one or more collaborative transactions based on a negotiated meta-model;
providing, by the computer, the collaboration software of the two or more enterprises access to a set of one or more predefined meta-model elements, each of the one or more predefined meta-model elements is incorporated into a negotiated meta-model that describes an agreement between the two or more enterprises as to collaborations between the two or more enterprises, each meta-model element comprising data describing standard for collaboration between the two or more enterprises;
receiving, by the computer, selections of one or more of the predefined meta-model elements and one or more meta-model elements that is newly defined by at least one of the enterprises for negotiation and incorporation into a negotiated meta-model, the one or more of the predefined meta-model elements or one or more metal-model elements comprising a demand signal element, a supply response element, and one or more exception conditions, the negotiated meta-model describing an agreement between the enterprises as to collaborations between the two or more enterprises;
facilitating, by the computer, negotiation of the selected meta-model elements between the two or more enterprises, wherein the negotiated meta-model includes semantics capable of being understood by the collaboration software associated with each of the two or more enterprises independent of any modification of the collaboration software, the collaboration software of the two or more enterprises automatically collaborates according to the standard for collaborations based on the negotiated meta-model;
incorporating, by the computer, negotiated meta-model elements into the negotiated meta-model for collaborations between the enterprises;
communicating, by the computer, the negotiated meta-model to the collaboration software of the enterprises to enable collaborations between the enterprises based on the standard for collaborations reflected in the negotiated meta-model;
automatically executing, by the computer, a supply response in accordance with the negotiated meta-model when a demand signal is communicated from the collaboration software of one of the two or more enterprises to the collaboration software of the other of the two or more enterprises and the demand signal is in accordance with the negotiated meta-model; and
automatically executing, by the computer, one or more exception conditions when a demand signal is communicated from the collaboration software of one of the two or more enterprises to the collaboration software of the other of the two or more enterprises and the demand signal is not in accordance with the negotiated meta-model.

13. The computer-implemented method of claim 12, further comprising communicating the negotiated meta-model to the collaboration software of the enterprises, the collaboration software configured to understand and collaborate based on the negotiated meta-model substantially automatically and substantially independent of modification to the collaboration software subsequent to negotiation of the meta-model.

14. The computer-implemented method of claim 12, wherein the agreement associated with the negotiated meta-model is machine-actionable at the collaboration software of the enterprises and reflects a private, differentiated standard for collaboration customized for particular needs of the enterprises.

15. The computer-implemented method of claim 12, wherein each of the one or more meta-model elements within the set comprise one or more of the following:
role types;
dimensions each comprising a supply chain element;
dimensionalities each comprising a combination of supply chain elements;
access of particular role types to particular dimensionalities;
collaborative transaction types relative to particular dimensionalities;
shared operations visible to the at least two enterprises; and
temporal structures of collaborative transactions.

16. The computer-implemented method of claim 15, wherein each of the one or more meta-model elements specifying a collaborative transaction type relative to a particular dimensionality comprises one or more of the following:
structure of the transaction;
data elements associated with the transaction;
a state model describing a life cycle of the transaction;
access that a role type has to data elements of the transaction relative to a state of the transaction;
actions that a role type can execute on the transaction relative to a state of the transaction; and
whether the transaction is a system of record or whether synchronization must occur with another system of record.

17. The computer-implemented method of claim 12, wherein the set of the one or more meta-model elements is specified in a template.

18. The computer-implemented of claim 12, wherein the meta-model negotiation service comprises a joint business planning network service (JBPNS).

19. The computer-implemented method of claim 12, wherein the meta-model negotiation service is associated with a network service provider through which the enterprises can negotiate the set of one or more meta-model elements.

20. The computer-implemented method of claim 12, wherein the negotiated meta-model is represented using extensible markup language (XML).

21. The computer-implemented method of claim 12, wherein a collaboration comprises execution of a business process or transaction based on the negotiated meta-model.

22. The method of claim 12, further comprising:
monitoring, by the computer, the one or more exception conditions; and
automatically executing an event based on a detection of an exception condition.

23. A non-transitory computer-readable storage medium embodied with software, the software when executed using one or more computer systems is configured to:
receive an indication from a collaboration software of two or more enterprises that the two or more enterprises wish to negotiate a standard for collaborations between the two or more enterprises, the collaboration software configured to execute one or more collaborative transactions based on a negotiated meta-model;
provide the collaboration software of the two or more enterprises access to a set of one or more predefined meta-model elements, each of the one or more predefined meta-model elements is incorporated into a negotiated meta-model that describes an agreement between the two or more enterprises as to collaborations between the two or more enterprises, each meta-model element comprising data describing a standard for collaboration between the two or more enterprises, the meta-model elements comprising a demand signal element, a supply response elements, and one or more exception conditions;
receive selections of one or more of the predefined meta-model elements and one or more meta-model elements that is newly defined by at least one of the enterprises for negotiation and incorporation into a negotiated meta-model, the negotiated meta-model describing an agreement between the enterprises as to collaborations between the two or more enterprises;
facilitate negotiation of the selected meta-model elements between the two or more enterprises, wherein the negotiated meta-model includes semantics capable of being understood by the collaboration software associated with each of the two or more enterprises independent of any modification of the collaboration software, the collaboration software of the two or more enterprises automatically collaborates according to the standard for collaborations based on the negotiated meta-model;
incorporate negotiated meta-model elements into the negotiated meta-model for collaborations between the enterprises; and
communicate the negotiated meta-model to the collaboration software of the two or more enterprises to enable collaborations between the two or more enterprises based on the standard for collaborations reflected in the negotiated meta-model;
automatically execute a supply response in accordance with the negotiated meta-model when a demand signal is communicated from the collaboration software of one of the two or more enterprises to the collaboration software of the other of the two or more enterprises and the demand signal is in accordance with the negotiated meta-model, execute a supply response in accordance with the negotiated meta-model; and
automatically execute one or more exception conditions when a demand signal is communicated from the collaboration software of one of the two or more enterprises to the collaboration software of the other of the two or more enterprises and the demand signal is not in accordance with the negotiated meta-model.

24. The non-transitory computer-readable storage medium of claim 23, further configured to communicate the negotiated meta-model to the collaboration software of the enterprises, the collaboration software configured to understand and collaborate based on the negotiated meta-model substantially automatically and substantially independent of modification to the collaboration software subsequent to negotiation of the meta-model.

25. The non-transitory computer-readable storage medium of claim 23, wherein the agreement associated with the negotiated meta-model is machine-actionable at the collaboration software of the enterprises and reflects a private, differentiated standard for collaboration customized for particular needs of the enterprises.

26. The non-transitory computer-readable storage medium of claim 23, wherein each of the one or more meta-model elements within the set comprise one or more of the following:
role types;
dimensions each comprising a supply chain element;
dimensionalities each comprising a combination of supply chain elements;
access of particular role types to particular dimensionalities;
collaborative transaction types relative to particular dimensionalities;
shared operations visible to the at least two enterprises; and
temporal structures of collaborative transactions.

27. The non-transitory computer-readable storage medium of claim 26, wherein each of the one or more meta-model elements specifying a collaborative transaction type relative to a particular dimensionality comprises one or more of the following:
structure of the transaction;
data elements associated with the transaction;
a state model describing a life cycle of the transaction;
access that a role type has to data elements of the transaction relative to a state of the transaction;
actions that a role type can execute on the transaction relative to a state of the transaction; and
whether the transaction is a system of record or whether synchronization must occur with another system of record.

28. The non-transitory computer-readable storage medium of claim 23, wherein the set of the one or more meta-model elements is specified in a template.

29. The non-transitory computer-readable storage medium of claim 23, wherein the meta-model negotiation service comprises a joint business planning network service (JBPNS).

30. The non-transitory computer-readable storage medium of claim 23, wherein the meta-model negotiation service is associated with a network service provider through which the enterprises can negotiate the set of one or more meta-model elements.

31. The non-transitory computer-readable storage medium of claim 23, wherein the negotiated meta-model is represented using extensible markup language (XML).

32. The non-transitory computer-readable storage medium of claim 23, wherein a collaboration comprises execution of a business process or transaction based on the negotiated meta-model.

33. The non-transitory computer-readable storage medium of claim 23, wherein the software further:
   monitors the one or more exception conditions; and
   automatically executes an event based on a detection of an exception condition.

* * * * *